April 20, 1943.　　J. J. TALLMAN　　2,317,000
TILTABLE LUMBER HOIST
Filed Sept. 29, 1941　　2 Sheets-Sheet 1

INVENTOR.
JESSE J. TALLMAN
BY
Chas. E. Townsend
ATTORNEY

April 20, 1943. J. J. TALLMAN 2,317,000
TILTABLE LUMBER HOIST
Filed Sept. 29, 1941 2 Sheets-Sheet 2
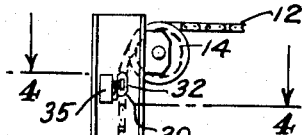
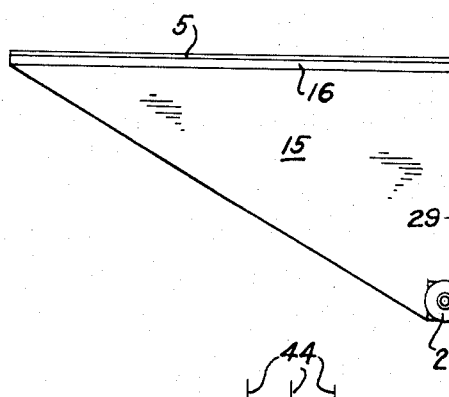
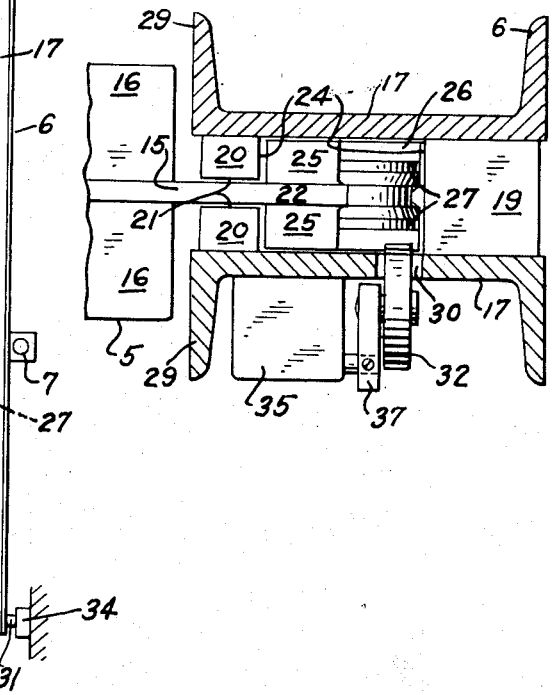
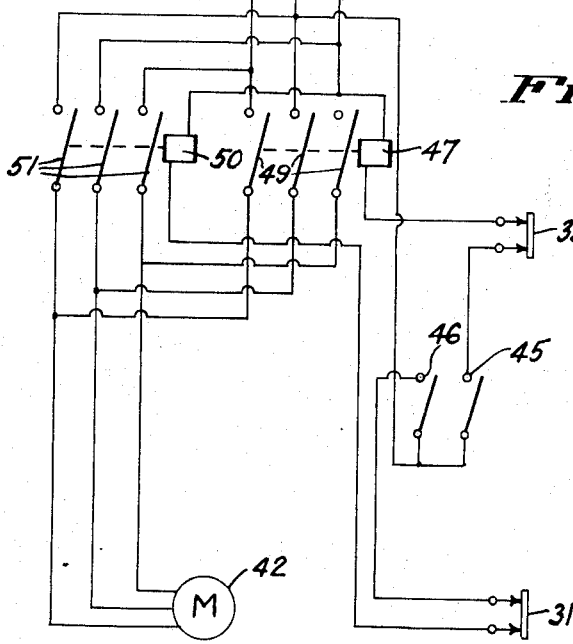
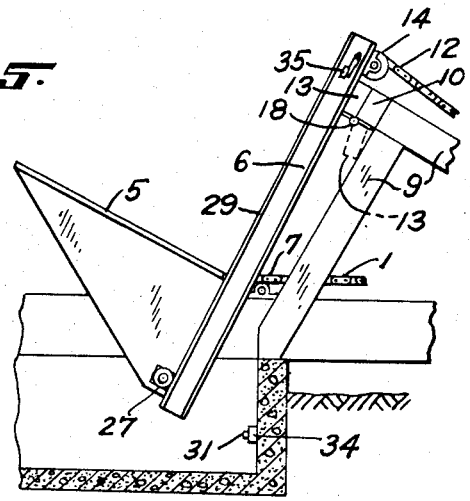
INVENTOR.
JESSE J. TALLMAN
BY
Chas. E. Townsend
ATTORNEY.

Patented Apr. 20, 1943

2,317,000

UNITED STATES PATENT OFFICE 2,317,000

TILTABLE LUMBER HOIST

Jesse J. Tallman, Fort Bragg, Calif.

Application September 29, 1941, Serial No. 412,725

8 Claims. (Cl. 214—8.5)

My invention relates to lumber hoists and particularly to a tilting type of hoist with automatic limit switches.

It is common practice in a lumber mill to produce a number of different sizes and types of boards and timbers from each log. Certain sizes of timbers or lumber may be in demand, or it may be necessary to produce certain sizes to get the maximum amount of usable lumber from a particular log.

Each of these sizes may require different treatment. For example, some rough timbers may be wanted, some finished lumber and some moldings. Different planing machines, shapers, and other equipment will be used to produce the variety required.

This procedure demands a very flexible system for transporting the unfinished and semifinished stock from machine to machine in the mill. Conveyor belts and chains, driven rollers, and gravity chutes are a few of the means used to carry the stock to a particular point, and automotive carriers are widely used to deliver a load from the output of one machine to a conveyor loading station leading to another machine which will perform the subsequent step in manufacturing the particular lumber product.

At the points of transfer, there will frequently be substantial vertical differences between one part of the conveyor system and another. Hoists must be provided at these stations, and it is desirable that they should operate to deliver the loads onto the higher conveyor with a minimum of attention by an attendant. In some hoists the load is raised vertically, and each board must then be individually handled by the attendant to move it off the stack onto the next conveyor. This procedure is slow and expensive in labor cost. In others, the load is held horizontally level but raised on guides at an angle to the vertical so that the point at which the boards are removed from the hoist is closer to the conveyor. This requires less exertion by the attendant and is generally more effective. An improved form carries the load up and sideways on guides, tilting it from the horizontal plane so that the boards will slide off onto the conveyor by gravity. In order to keep the load in an orderly stack while it is raised on the tilted guide track, stakes must be provided. Near the top of the hoist traverse, the operator raises the hoist in steps just high enough to allow one layer of boards at a time to slide off the stack over the stakes onto the conveyor.

I provide an improved form in which the functions of the stakes and the sloping guides are combined in one hoisting mechanism. This reduces the cost of manufacture substantially and simplifies the construction. This is made possible by separately pivoting the tilting hoist members and arranging them to act as guide members which automatically maintain the load in alignment. In addition I have provided a simplified mechanism by which the tilting and hoisting are performed as a continuing operation, requiring no attention by the operator in making the transition. As each layer of lumber is raised to the proper point, it is delivered from the hoist by gravity to the next conveyor, under complete control by the operator, and with utmost regard to his safety and to that of the equipment, utilizing automatic means for cutting off the power both at the upper end and at the lowest part of the hoist traverse.

It is thus an object of my invention to provide an improved hoist operable with a minimum amount of power. Another object is to provide a hoist in which the possibility of damage to the hoist or its operator is reduced to a minimum. A further object is automatically to limit the range of movement of the hoist both in its vertical and its tilting movements. A still further object is to provide a hoist in which lumber of various thicknesses and widths may be hoisted in load units and discharged onto a conveyor belt, or equivalent device, one layer at a time. A further object is to reduce the necessity for great skill on the part of the hoist operator.

These and other objects will be apparent to those familiar with the art from an inspection of the drawings and a study of the detailed description set forth hereafter. It is to be recognized that the embodiment shown is exemplary only of the principles of my invention and that I retain the right to modify the construction or to produce other embodiments within the scope of the appended claims.

In the figures:

Fig. 3 is a side view illustrating details of the construction of the tilting hoist arms.

Fig. 4 is a fragmentary sectional view of one of the tilting guide members and the hoist arm associated therewith, taken along line 4—4 of Fig. 3 and showing its relation to the upper limit switch.

Fig. 5 is a circuit diagram, showing the connections through the limit switches and the direction control switch to the motor.

Fig. 6 is a fragmentary detailed view of a modification of the tilt stop.

Figure 1:
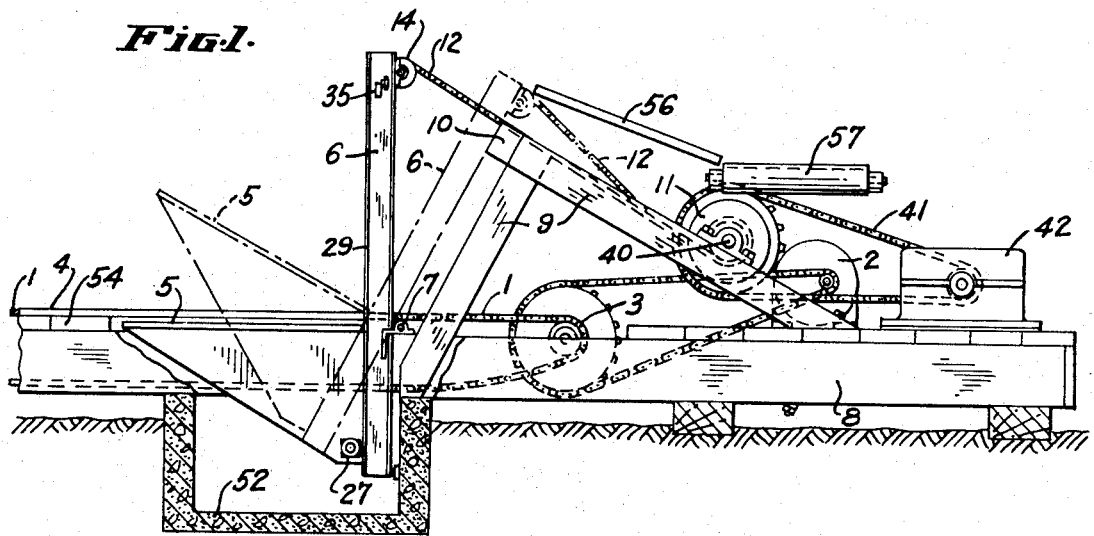
Fig. 1 is a schematic side view of a hoist made in accordance with my invention.

In brief, my invention includes two or more initially vertical, tiltable guide members spaced apart and each independently pivoted about a common axis, on each of which guide members there is traversable, in unison with the other cooperating arms, a hoist arm held at a fixed angle of 90° relative to the guide member. In operation, the hoist arms are at floor level and the guide members are disposed vertically. A load of lumber is deposited by any suitable means onto a conveyor, for example a feed chain, which moves it onto the hoist arms. A hoisting chain or cable is connected to the hoisting arms and led over a pulley at the top of the guide columns to a drum driven by motor. As the load is carried onto the hoisting arms, it is vertically aligned by engagement with the guide columns. When tension is first applied to the hoisting cable by the motor, my hoist is arranged so that the guide columns and the load tilt about a preferred point. By placing the pivot for the guide columns at this point, the center of gravity of the load is raised through a minimum distance during tilting.

Tilting is limited by a stop which extends the full width of the hoist assembly. It is desirable to tilt the hoist to a lesser degree when finished lumber is being handled than with rough lumber. Means are hence provided to change the permissible angle of tilt.

When the hoist has been tilted against the stop, raising of the load commences, and the operator controls the motor so that one layer of lumber at a time will slide off the top and onto a feed chain or other conveyor means for transmission to the next machine operation.

Referring back to Figs. 1 and 2 of the drawings, I have shown the device in full lines in the initial upright position of the guide columns and horizontal position of the hoist arms, while in dotted lines I have shown the initial tilted position at the start of hoisting for subsequent discharge onto the feed table.

I provide conveying means, for example floor chains 1 driven by a motor 2 through floor chain sprockets 3, to move a load not shown in the figure, from feed position 4 onto the hoist arms 5 against tilting skid or guide columns 6. The guide columns 6 are pivoted at 7 to a main supporting framework 8, made of heavy timbers or any equivalent construction, which carries the floor chain motor 2. A triangularly braced stop frame 9 is secured to the main frame 8, and has attached thereto a tilt stop 10, extending the full width of the framework, against which the guide columns 6 may rest in tilted position.

It is desirable to set the stop 10 so that there will be an angle of approximately 62° for rough lumber between the horizontal and the guide columns 6 in their tilted position, and less for surfaced lumber. In Fig. 6 is illustrated means for changing the tilt angle. An intermediate block 13 is secured by a hinge 18 to the lower side of stop 10 in alinement with each guide column 6. When smooth lumber is to be handled, the blocks 13 are raised by manual or other suitable means to the position shown, so that the guide columns 6 are only allowed to tilt to an angle greater than 62° to the horizontal. The blocks 13 will be held in the position shown by gravity until the operator again returns them to the dotted line position occupied during the handling of rough lumber.

I have illustrated my invention with three hoisting arms, but it will be obvious that I can use two or can add as many additional arms as are necessary to handle longer lumber. The additional hoist arms may be progressively spaced laterally of the framework 8, and the stop frame 9 and stop 10 similarly extended.

The stop framework 9 supports hoisting drums 11, on which are wound hoisting cable chains 12 extending over pulleys 14 pivotally mounted at the top of each guide column 6, and anchored to the hoisting arm 5 by any conventional method.

Details of the hoisting arm 5 and guide column 6 are shown in elevation in Fig. 3 and fragmentarily in cross section in Fig. 4. Hoisting arm 5 consists of a vertically disposed flat plate or web 15 and a horizontal load-engaging surface defined by two angle members 16.

Guide column 6 is made up of two channel members 17 secured back to back by a rear spacing member 19 on the side opposite hoisting arm 5. Adjacent arm 5, front spacing members 20 are secured to each channel 17, defining between them a guide slot 21 into which extends the rear edge 22 of hoist arm web 15.

Front spacing members 20, rear spacing member 19, and channels 17 define a track 24 in which elongated rectangular bosses 25 fixed to the rear edge 22 of the hoist arm web 15 may slide to guide the hoist arm 5.

Bosses 25 extend the full height of arm 7, and are cut away at the top above rearward portion 26 to provide space for the passage of cable chain 12 within channel 24. An anchor 27 is formed integrally with the bosses 25, near the top and above the bottom portion 26, for the cable chain.

Hoist arms 5 are additionally guided by rollers 27, disposed on each side of web 15 at its lower extremity, riding against the forward faces 29 of channels 17. The lubrication of the rollers 27 and of the track 24 is provided by conventional means, not shown in the figures.

I utilize the rearward portion 26 of the bosses 25 to protect the hoist against damage in case of carelessness by the operator in stopping it at the upper limit of its traverse. Safety slot 30 is formed through the upper end of one of the channels 17 to allow upper limit switch roller 32 to project into the track 24. Upper limit switch 35 is linked operatively to the roller 32 by roller arm 37. When the upper limit switch roller 32 is engaged by the rearward portion 26 of bosses 25 and forced outwardly through slot 30, the circuit to the hoisting motor is opened, preventing the hoist arms from being drawn out of guide columns 6 at the top. A lower limit switch 31 is set into a lower stop block 34 mounted in the pit or well 52. Lower stop block 34 alines the guide columns 6 in their untilted position. The switch 31 will open whenever the columns 6 engage the stop block 34. Hoist arms 5 cannot be lowered after the columns 6 have been returned to vertical, and hence rollers 27 can never be driven downwardly off their track 29.

The hoisting drums 11 are driven through a common drive shaft 40 by a chain 41 driven by a hoisting motor 42 mounted on the main framework 8. The connections to the hoisting motor 42 from the power source are shown schematically in Fig. 5, in which motor 42 is indicated as of the three-phase A. C. type, fed by power lines 44. The attendant controls the hoist through a hoisting switch 45, and a lowering switch 46, conveniently operated by foot pedals, not shown.

Hoisting switch 45 is connected in series with upper and lower limit switches 35 and 31 to a conventional relay arrangement 47 for operating a three-pole single-thrown power switch 49, which directly connects power lines 44 to the hoisting motor 42.

Lowering switch 46 is connected in series with lower limit switch 36 and a relay arrangement 50 which controls a three-pole single-throw switch 51. Switch 51 causes motor 42 to operate in the opposite direction by conventionally reversing the phase connections from those made by switch 49.

It will be observed that the foot-operated hoisting and lowering switches 45 and 46 cannot raise the hoist if upper limit switch 35 is open, or lower it if lower limit switch 31 is open; switches 45 and 46 are also conventionally arranged to be closed only when pressure is applied by the operator; thus the machine is prevented from working when unattended, and from over-running if the operator should be negligent.

When the loaded hoist arms 5 are being raised, movement ceases almost instantly when the circuit to the hoisting motor 42 is opened. In lowering, however, a movement of several inches usually occurs after cutoff. Hence the positions of lower slot 31, roller 34, and limit switch 36 are adjusted so the cutoff will occur several inches above the desired final position of the hoist arms 5.

Figure 2:
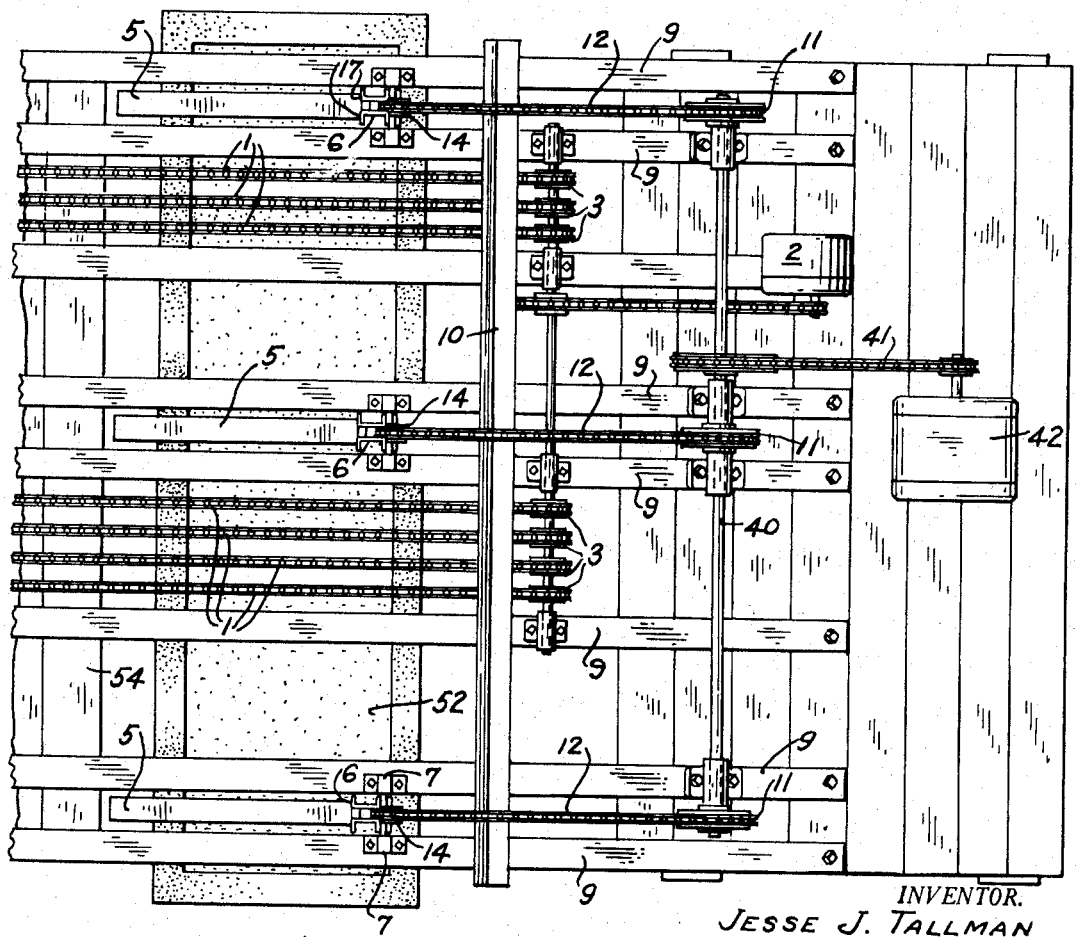
Fig. 2 is a top view of the hoist shown in Fig. 1.

In Fig. 1, I have shown the main framework 8 mounted adjacent a floor well 52 which allows the hoist arms 5 to be lowered so that their top engaging surfaces 16 are flush with, or slightly below the level of the floor 54. Well 52 is large enough to provide space for workmen cleaning and maintaining the hoist, and for the tilting movement.

As the top of the tilted stack of lumber loaded on the hoist arms 5 is raised above the upper end of guide columns 6, the lumber will slide off onto a gravity skid 56 or other suitable means for guiding it onto a succeeding conveyor 57. The attendant raises the hoist arms just enough to discharge one layer at a time. He is thus freed from the necessity of manually shifting the entire load, piece by piece, onto conveyor 57.

From the above description, it will be apparent that I have invented a lumber hoist which is safe in operation, protecting both men and equipment. It requires no special skill to operate, and reduces the number of controls to a minimum. No attention is required to change from tilting to hoisting, and the discharging is simple and necessitates no exertion on the part of the operator. By eliminating manual handling of the load, speedier and more efficient operation is secured, and the equipment has been designed for manufacture and maintenance costs which represent a substantial economy to the mill.

What I claim is:

1. In a lumber hoist, the combination of a plurality of vertical straight guide columns independently pivoted with respect to one another upon a common framework, hoisting arms traversable along said guide columns and making a fixed angle therewith, means secured to said hoisting arms arranged to produce tilting of said guide columns through a predetermined angle prior to movement thereon of said hoisting arms.

2. In a lumber hoist, the combination of a tilting guide column, a hoisting arm making a fixed angle with said column, means secured to said hoisting arm operable first to tilt the said guide column and hoisting arm and subsequently to raise said hoisting arm along said guide column at a constant angle with respect to the perpendicular throughout traversal, and means for preventing movement of said hoisting arm beyond predetermined limits.

3. In a lumber hoist, the combination of a pivotally mounted straight guide column, a hoisting arm disposed normally thereto traversable along said column, hoisting means operable through a continuing movement to tilt said pivotally mounted column and to raise said arm therealong at a constant angle with respect to the perpendicular throughout traversal, and means for preventing movement of said arm beyond predetermined limits.

4. In a lumber hoist, the combination of a pivotally mounted straight guide column, said column pivoted about an axis which is in substantially the same horizontal plane as the hoisting arm before hoisting thereof, a hoisting arm disposed normal to said column, means operable in a continuing step to tilt said column and raise said arm therealong at a constant angle with respect to the perpendicular throughout traversal, adjustable means for limiting the angle of tilt of said column, and means for limiting traversal of said arm.

5. In a lumber hoist, the combination of independently pivoted straight guide columns pivoted about a common axis, said common axis being in substantially the same horizontal plane as the hoisting arms before hoisting thereof, the said hoisting arms disposed on said columns and normal thereto; means including pulleys disposed at the top of said columns, cable chains extending over said pulleys and connected to said arms and motor means for winding up said chains for sequentially tilting said columns and raising said arms in a continuing movement at a constant angle with respect to the perpendicular throughout traversal, a directional control for said motor means, and means for preventing operation of said motor means beyond desired limits of movement of said arms.

6. In a lumber hoist, the combination of pivotally mounted guide columns, hoisting arms disposed normally on said columns; a pulley at the top of each column, a tension member disposed over said pulley and connected to said arm, motor means for drawing on said tension member successively to tilt said column and raise said arm, a stop frame limiting the angle of such tilting, switches arranged to prevent operation of said motor beyond predetermined limits, means for controlling the direction of movement of said arms, means for delivering lumber to said hoist at the lower hoist arm position, and means for directing lumber away from the upper position of said arms.

7. In a lumber hoist, the combination of a pivotally mounted guide column, a hoisting arm disposed normally thereto traversable along said column, hoisting means operable through a continuing movement to tilt said pivotally mounted column and to raise said arm therealong, and means formed integrally with said hoist arm adapted to actuate a limit switch at a predetermined point of traversal of said hoisting arm along said guide column, said limit switch including a contact member projected into the path of traversal of said hoist arm within said guide column.

8. In a lumber hoist, the combination of a pivotally mounted guide column, a hoisting arm disposed normally thereto traversable along said column, hoisting means operable through a continuing movement to tilt said pivotally mounted column and to raise said arm therealong, and means for preventing movement of said arm beyond predetermined limits, comprising a safety slot formed in the upper end of said guide column adapted to receive a portion of a roller, said roller linked operatively to a limit switch whereby said limit switch is adapted to be actuated by means formed integrally with said hoisting arm at a predetermined point of traversal of said hoisting arm along said guide column.

JESSE J. TALLMAN.